Feb. 12, 1952     W. J. ZIMMERSCHIED ET AL     2,585,292
PREPARATION OF ALKYL THIOPHENES
Filed Aug. 17, 1950
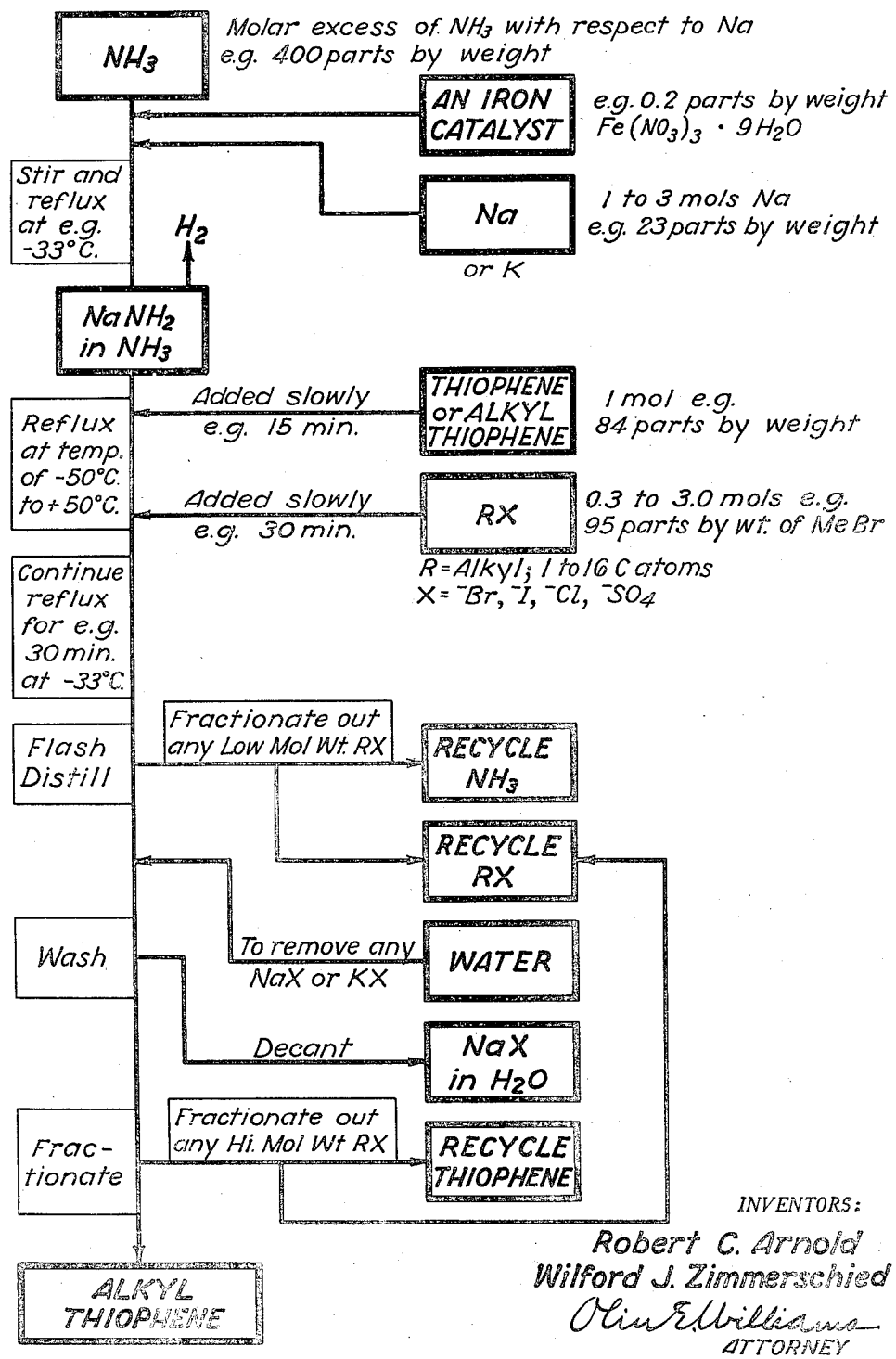
INVENTORS:
Robert C. Arnold
Wilford J. Zimmerschied
Olin E. Williams
ATTORNEY Patented Feb. 12, 1952

2,585,292

UNITED STATES PATENT OFFICE 2,585,292

PREPARATION OF ALKYL THIOPHENES

Wilford J. Zimmerschied, Hammond, Ind., and Robert C. Arnold, Park Forest, Ill., assignors to Standard Oil Company, Chicago, Ill., a corporation of Indiana Application August 17, 1950, Serial No. 179,966

5 Claims. (Cl. 260—329)

This invention relates to the preparation of alkyl derivatives of thiophene and has particular reference to a process of alkylation of thiophene and homologs thereof having an unsubstituted alpha carbon atom.

A primary object of the present invention is the preparation of alkyl derivatives of thiophene having one or two aliphatic radicals each of which may contain from one to sixteen carbon atoms. Other objects of the invention will appear in the specification and claims hereinafter made.

Thiophene is to be found in the light oil from the destructive distillation of coal, has been prepared by synthesis from acetylene and a sulfur compound and by cyclizing butyl mercaptan, and is recovered from various petroleum fractions or products of petroleum reforming processes. It is the last mentioned source which continues to provide an increasing supply of thiophene as an increasing number of processes for separating sulfur compounds from petroleum products are employed. The alkyl derivatives of thiophene, which at present are useful as drugs or dyes either directly or as intermediates, have a wide potential usefulness that will become actual as they become more available. The provision of long chain alkyl thiophenes supplies a source of intermediates for synthesis of detergents and wetting agents.

The objects of the present invention are accomplished by a stepwise process briefly described as admixing thiophene with an alkali-metal amide dispersed in liquid ammonia and thereafter adding an alkyl mono-halide or sulfate to form an alkylated thiophene. The alkyl radical of the alkylating agent can have from one to sixteen carbon atoms, the latter number being substantially the maximum number of carbon atoms that can be present in an alkylating agent that is soluble in liquid ammonia at maximum operating temperatures. The alkali-metal amide can be added to the reaction mixture as such or be prepared in situ by adding elemental alkali metal to the liquid ammonia and effecting reaction therebetween in the presence of an iron catalyst.

Reaction is carried out in liquid phase and consequently the pressure employed must be at least such as to maintain ammonia in a boiling condition at the reaction temperature employed. The reaction temperature can vary between —50° and +50° C. and preferably between —50° to +25° C. At atmospheric pressure, the most practicable temperature is —33° C., i. e. the boiling point of ammonia.

After reaction, the ammonia is separated from the unconverted reactants and product, the mixture of reactants and product is washed with water to remove sodium halide, and finally, the product is separated from the unconverted reactants by distillation.

The product will contain a predominant proportion of the alkyl thiophene corresponding to the aliphatic radical of the alkyl monohalide employed in the synthesis. A surprising aspect of this alkylation is the fact that the product of such alkylation in the presence of an alkali metal amide in liquid ammonia results substantially solely in the formation of the alpha mono isomer of the particular alkyl thiophene. Infra red examination of the products in no instance revealed the presence of beta alkyl thiophene, even though in any alkylation one might expect a substantial portion of a second isomer, and in this instance of a basic catalyzed alkylation, beta isomer formation is even more to be expected.

This preparation of alpha alkyl thiophenes is limited to the employment of thiophene or an alkyl thiophene having at least one unsubstituted alpha carbon atom and does not include other organic sulfur compounds to be found in petroleum fractions, as, for example, alkyl mercaptans or alkyl sulfides. It is likewise true that the alkylation can be performed only with an alkyl monohalide. Alkyl dihalides such as 1,2-dihalides were found to be inactive and failed to react with thiophene under conditions which gave alkylation when a monohalide was employed.

In the accompanying drawing the single figure is a flow sheet diagrammatically representing a preferred embodiment of the process of the present invention and illustrating certain quantity relationships of the reactants as set forth in Example I.

According to the present invention and with reference to the said flow sheet an iron catalyst, for example, a hydrated ferric nitrate, is added to liquid ammonia. Elemental sodium is added to a molar excess of the catalyst-containing liquid ammonia and the mixture is stirred and preferably refluxed, particularly to maintain the ammonia in liquid form by cooling the refluxing vapors. The elemental sodium can also be added to the ammonia before addition of the catalyst. The iron catalyst catalyzes reaction between the sodium and liquid ammonia to convert the sodium entirely to sodamide. After completion of reaction forming the sodamide and consequently complete consumption of the elemental sodium, thiophene is added to the solution of sodamide in liquid ammonia. The thiophene, being warmer than the ammonia medium, is preferably slowly added to the liquid ammonia for purposes of temperature control. A ratio of approximately 1 to 3 mols of sodamide per mol of thiophene is maintained. An alkyl mono halide or mono sulfate in which the alkyl group has from 1 to 16 carbon atoms per molecule is added to the reaction mixture in a proportion from about 0.3 to 3.0 mols of the alkylating agent per mol of thiophene and during said addition the admixture is refluxed at a temperature between about —50° C. and +25° C. The alkylating agent is preferably added to the reaction mixture after the addition of the thiophene, especially when it is desired to avoid the formation of substantial quantities of dialkyl thiophenes. However, the alkylating agent can be added to the reaction mixture in admixture with the thiophene or even entirely prior to the addition of the thiophene. The alkylating agent is also preferably added slowly in order to avoid disturbing the uniform temperature control. Refluxing of the reaction mixture is continued at the selected temperature until substantial completion of reaction is accomplished. Unreacted ammonia is separated from the so-obtained product, preferably by a flash distillation.

In those instances where a low molecular weight alkylating agent is employed it may be distilled from the reaction product along with the ammonia. In such instances unreacted alkylating agent is fractionated from the separated ammonia. This recovered ammonia, substantially free of alkyl halide or sulfate, can be returned to the initial step of the process. The flash distilled product is preferably water washed to remove the alkali metal halide or sulfate that is a by-product of the reaction. The water washed product is fractionally distilled to remove therefrom unreacted thiophene. This separated thiophene will also contain unreacted alkylating agent when higher molecular weight alkylating agents are employed. In such instances the alkylating agent is fractionally distilled from the said thiophene and can be recycled to the process. An alpha substituted alkyl thiophene substantially free of reaction products and by-products is thus obtained.

An alkyl thiophene having at least one unsubstituted alpha carbon atom can be employed in the place of thiophene in the process. In such instances the product will be a poly alkyl thiophene in which the so-added alkyl chain is attached to an alpha carbon atom.

In the following specific examples, presented for the purpose of illustrating this invention, thiophene in liquid ammonia is alkylated by various alkylating agents in the presence of sodamide or potassium amide.

*Example I*

In this example alpha methyl thiophene was prepared by alkylation of thiophene in liquid ammonia by methyl bromide in the presence of sodamide prepared in situ.

A reaction medium or bath was prepared by introducing 400 parts by weight of liquid ammonia into a reaction vessel having a motor driven stirrer and fitted with a reflux condenser that was cooled by a mixture of Dry Ice and acetone. There was then added to the medium 0.2 part by weight by hydrated ferric nitrate. Sodamide was prepared in situ by the addition of 23 parts by weight of sodium to the refluxing ammonia. To the so-formed solution of sodamide in ammonia were slowly added, over a period of 15 minutes, 84 parts by weight of thiophene. Refluxing at —33° C. and atmospheric pressure was continued and 95 parts by weight of methyl bromide were added by slowly flowing the gaseous methyl bromide into the bottom of the reaction mass over a period of thirty minutes. A mol of sodium and a mol of thiophene per mol of methyl bromide were used. After an additional thirty minutes of reaction time sufficient water was added to the mixture to take up ammonia and to dissolve the formed sodium bromide. The reaction mixture was thereafter removed to a separating vessel from which the hydrocarbon product was decanted. The decanted material was washed with dilute hydrochloric acid and thereafter fractionated, thus exhibiting the following distribution between product and unreacted thiophene:

|  | Decanted Per Cent of Material | B. P., °C. | $n_D^{20}$ |
|---|---|---|---|
| Thiophene | 21 | 84 | 1.5273 |
| 2-methylthiophene | 79 | 112 | 1.5200 |

*Example II*

In this example alpha methyl thiophene was prepared by alkylation of thiophene in liquid ammonia by methyl bromide in the catalytic presence of a commercially obtained sodamide.

In a manner substantially as described in Example I, a gram mol. of thiophene was slowly added to 700 cc. of liquid ammonia containing a gram mol of commercial sodamide. The solution was refluxed at —33° C. during the slow introduction of 1 mol of gaseous methyl bromide. After the washing and fractional distillation steps set forth in Example I, there was obtained a 48% yield of pure alpha methyl thiophene having a boiling point of 112° C., and an index of refraction $(n_D^{20})$ of 1.5201. The yield calculated on a basis of the weight of converted thiophene was 55%.

*Example III*

In this example pure alpha ethyl thiophene was prepared by alkylation of thiophene in liquid ammonia by ethyl bromide in the presence of commercially obtained sodamide.

To 800 cc. of liquid ammonia was added 2.25 gram mols of commercial sodamide. The solution was refluxed at —33° C. in the manner set forth in the preceding examples. During the said refluxing one gram mol of thiophene was slowly added to the solution. Thereafter a gram mol of liquid ethyl bromide was slowly added to the reaction mixture. After continued refluxing until substantial completion of reaction was obtained purification steps substantially as set forth in Example I were employed. A yield of 39% by weight of theoretical of pure alpha ethyl thiophene, or 48% based on the weight of converted thiophene, was obtained. This isomer of ethyl thiophene was found to have a boiling point of 135° C. and an index of refraction $(n_D^{20})$ of 1.5127. An infra red examination showed the product to be a high purity alpha ethyl thiophene and there was no evidence of any beta ethyl thiophene. There was also produced about 5%, by weight based on the thiophene, of alpha alpha' diethyl thiophene $(n_D^{20}=1.5030; d_{20}^4=0.945)$.

Example IV

In this example twice the relative weight of ethyl bromide was employed as was employed in Example III. This example demonstrates the effect on yield that is obtained by thus varying the ratio of reactants.

Under conditions substantially identical to that described in Example I, one mol of thiophene was slowly added to a refluxing solution containing 1000 cc. of liquid ammonia and 2.25 mols of commercial sodamide. Thereafter two gram mols of liquid ethyl bromide were slowly introduced into the reaction mixture while continuing to reflux the liquid ammonia solution at approximately $-33°$ C. After the usual purification steps a yield based on the theoretical of 68% was obtained, and the yield based on the thiophene consumed was 73%. It can be seen that the employment of an excess of ethyl bromide more efficiently consumed the thiophene reactant.

Example V

In this example pure alpha ethyl thiophene was prepared by alkylating thiophene in liquid ammonia with ethyl chloride in the presence of commercial sodamide.

Under conditions substantially identical to those described in Example I, one gram mol of thiophene was slowly added to 700 cc. of liquid ammonia containing in solution one gram mol of commercial sodamide. The solution was refluxed at the boiling temperature of ammonia at atmospheric pressure and to the refluxing solution was slowly added one gram mol of liquid ethyl chloride. A yield of 20% by weight based on the theoretical of pure alpha ethyl thiophene or 23% based on the weight of thiophene converted was obtained after the previously described purification steps were employed.

Example VI

A substantially pure alpha octyl thiophene was prepared by alkylating thiophene in liquid ammonia with octyl bromide in the presence of commercial sodamide.

Under conditions substantially identical to those described in Example I a mol of thiophene was slowly added to 800 cc. of liquid ammonia containing in solution two gram mols of sodamide. The solution was refluxed at a temperature of $-33°$ C. and one mol of thiophene was slowly added thereto. Refluxing was continued during the slow addition of two mols of octyl bromide. Refluxing was thereafter continued for a period of about one-half hour after which washing and fractionation steps substantially as described in Example I were employed. A yield based on the theoretical of 58% of substantially pure alpha octyl thiophene was obtained. The octyl thiophene had a boiling point of 151° C. at 30 mm. Hg pressure and an index of refraction ($n_D^{20}$) of 1.4921. The yield based on the weight of thiophene converted was 70%.

Example VII

In this example elemental sodium was added to liquid ammonia but no iron catalyst was employed so that only a trace of sodamide could be present in the liquid ammonia solution.

Here again reaction conditions were substantially as described in Example I and one gram mol of thiophene and subsequently one gram mol of liquid ethyl bromide were added to 700 cc. of liquid ammonia containing a mol of elemental sodium while the solution was being refluxed at a temperature $-33°$ C. Although a yield of 45% by weight of theoretical of alkylated product was obtained it is interesting to observe that the absence of adequate amounts of sodamide resulted in the production of a contaminated alkyl thiophene, as shown by infra red analysis, instead of the substantially pure alpha alkyl thiophenes produced in the other examples.

Example VIII

In this example thiophene in liquid ammonia was alkylated in the presence of potassium amide that was prepared in situ.

In a manner and under conditions similar to those described in Example I, 39 grams or one gram mol of elemental potassium was added to 700 ml. of liquid ammonia, maintained at the boiling temperature of ammonia under atmospheric pressure. The elemental potassium was converted to potassium amide in the presence of a catalytic quantity of hydrated ferric nitrate. Subsequently one gram mol of thiophene and then one gram mol of ethyl bromide were slowly added to the ammonia solution during continued refluxing. Although some product was lost in the performance of this run, nevertheless a yield of 19% by weight of theoretical of substantially pure alpha ethyl thiophene was obtained.

Example IX

In this example thiophene dissolved in liquid ammonia was alkylated by dimethyl sulfate.

Under conditions substantially identical to that described in Example I, one gram mol of thiophene was slowly added to 800 ml. of liquid ammonia and containing one gram mol of sodamide. To this reaction mass there was slowly added during refluxing at $-33°$ C. a gram mol or 126 grams of liquid dimethyl sulfate. After completion of reaction and purification of product by the steps described in Example I, a yield of alpha methyl thiophene by weight of theoretical of 53% and by weight of converted thiophene of 81% was obtained.

In none of the preceding specific examples did any evolution of gaseous hydrocarbons occur during alkylation, thus eliminating the possibility of metallation of thiophene by any alkyl sodium. It was further observed that it was not possible to carbonate the intermediate mixture of thiophene and sodamide, thus proving the absence of any direct metallation of thiophene. Additional specific examples were performed employing 1,1 and 1,2-dihalides without effecting production of alkyl thiophene.

As previously stated the products of this process are useful as dyes, drugs, and detergents, or as intermediates therefor. The process is also useful in providing the desulfurization of mixtures that contain thiophene or alkyl thiophene especially when the thiophene is difficultly separable therefrom by distillation. An example of this is the desulfurization of benzene containing thiophene. While thiophene is difficult to separate from benzene by distillation, alkylated thiophene is readily separable.

Having described our invention, we claim the following:

1. A process of preparing an alpha alkyl thiophene comprising adding an elemental alkali metal to a molar excess of liquid ammonia, adding to the said liquid ammonia and alkali metal an iron catalyst, effecting reaction between the ammona and alkali metal in the presence of the said catalyst to form an alkali-metal amide, adding to the liquid ammonia containing the so-formed alkali-metal amide a compound selected from the group consisting of thiophene and alkyl homologs thereof having at least one unsubstituted alpha carbon atom, introducing an alkylating agent into the admixture, the said agent having an alkyl radical of at most 16 carbon atoms and being selected from the group consisting of alkyl iodide, alkyl bromide, alkyl chloride and alkyl sulfate, maintaining the liquid ammonia and admixed components at a temperature between about −50° and +50° C. to effect reaction therebetween, and recovering an alpha alkyl thiophene from the reaction mixture.

2. A process of preparing a mono alpha alkyl thiophene comprising the steps of providing an admixture of an alkali metal amide with liquid ammonia, adding thiophene thereto, refluxing the said liquid ammonia solution plus the added components at a temperature between −50° and +25° C., thereafter introducing an alkylating agent having an alkyl radical of at most 16 carbon atoms per molecule and selected from the group consisting of alkyl iodide, alkyl bromide, alkyl chloride and alkyl sulfate, continuing said refluxing of the admixture during addition of the said alkylating agent and for a period thereafter to effect reaction between the said thiophene and the alkylating agent, and thereafter recovering a mono alpha alkyl thiophene from the reaction mixture.

3. A process of preparing a mono alpha alkyl thiophene comprising the steps of providing an admixture of an alkali metal amide with liquid ammonia, adding thiophene thereto, refluxing the said liquid ammonia solution plus the added components at a temperature between −50° and +25° C., thereafter introducing an alkylating agent having an alkyl radical of at most 16 carbon atoms per molecule and selected from the group consisting of alkyl iodide, alkyl bromide, alkyl chloride and alkyl sulfate, continuing said refluxing of the admixture during addition of the said alkylating agent and for a period thereafter to effect reaction between the said thiophene and the alkylating agent, flash distilling ammonia from the product containing reaction mixture, water washing the so-distilled product to remove alkali-metal salt therefrom, and fractionating the water washed product to remove unreacted thiophene, and separate thereby an alpha alkyl thiophene.

4. A process of preparing an alpha alkyl thiophene comprising: providing an admixture of an alkali metal amide with liquid ammonia, admixing therewith a compound selected from the group consisting of thiophene and alkyl homologs thereof having at least one unsubstituted alpha carbon atom, introducing an alkylating agent into the admixture, the said agent being an alkyl halide having an aliphatic radical of at most 16 carbon atoms, maintaining the liquid ammonia and admixed components at a temperature between about −50° and +50° C. to effect reaction therebetween, and recovering an alpha alkyl thiophene from the reaction mixture.

5. A process of preparing an alpha alkyl thiophene comprising: providing an admixture of an alkali metal amide with liquid ammonia, admixing therewith a compound selected from the group consisting of thiophene and alkyl homologs thereof having at least one unsubstituted alpha carbon atom, introducing into the admixture an alkylating agent that is an alkyl sulfate in which each alkyl radical has at most 16 carbon atoms, maintaining the liquid ammonia and admixed components at a temperature between about −50° and +50° C. to effect reaction therebetween, and recovering an alpha alkyl thiophene from the reaction mixture.

WILFORD J. ZIMMERSCHIED.
ROBERT C. ARNOLD.

REFERENCES CITED

The following references are of record in the file of this patent:

Eisleb: Ber. 74B 1433–1450 (1941).